United States Patent
Spence et al.

(10) Patent No.: US 7,844,133 B2
(45) Date of Patent: Nov. 30, 2010

(54) METHOD AND SYSTEM FOR FILTERING, REGISTERING, AND MATCHING 2.5D NORMAL MAPS

(75) Inventors: Clay Douglas Spence, Princeton Junction, NJ (US); Craig Langdale Fancourt, Lawrenceville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 12/604,876

(22) Filed: Oct. 23, 2009

(65) Prior Publication Data

US 2010/0172597 A1 Jul. 8, 2010

Related U.S. Application Data

(62) Division of application No. 11/451,671, filed on Jun. 13, 2006, now Pat. No. 7,747,106.

(60) Provisional application No. 60/689,967, filed on Jun. 13, 2005, provisional application No. 60/690,118, filed on Jun. 13, 2005.

(51) Int. Cl.
*G06K 9/32* (2006.01)
(52) U.S. Cl. .................. 382/294; 345/584
(58) Field of Classification Search ............ 382/294; 345/581–584
See application file for complete search history.

(56) References Cited

U.S. PATENT DOCUMENTS

| | | | |
|---|---|---|---|
| 5,028,138 A * | 7/1991 | Wolff | 356/369 |
| 5,900,881 A | 5/1999 | Ikedo | |
| 6,271,847 B1 * | 8/2001 | Shum et al. | 345/418 |
| 6,384,824 B1 * | 5/2002 | Morgan et al. | 345/426 |
| 6,756,979 B2 | 6/2004 | Ohba et al. | |
| 6,765,584 B1 * | 7/2004 | Wloka et al. | 345/584 |
| 7,064,753 B2 * | 6/2006 | Ohba et al. | 345/419 |
| 2004/0207631 A1 | 10/2004 | Fenney et al. | |

OTHER PUBLICATIONS

Besl et al., A Method for Registration of 3-D Shapes, Feb. 1992, IEEE Transactions on Pattern Analysis and Machine Intelligence, vol. 14, Issue: 2,pp. 239-256.*
Astola, J., Haavisto, P., and Neuvo, Y.,"Vector median filters," Proceedings of the IEEE, vol. 78, Issue 4, Apr. 1990 pp. 678-689.
Woodham R.J., "Photometric method for determining surface orientations from multiple images," Optical Engineering, vol. 19, pp. 139-144, 1980.
Zhang R., Tsai P.S., Cryer J., and Shah M., "Shape from Shading: A Survey," IEEE Trans. on Pattern Analysis and Machine Intelligence, vol. 21, No. 8, pp. 690-706, 1999.

(Continued)

*Primary Examiner*—Bhavesh M Mehta
*Assistant Examiner*—Dennis Rosario
(74) *Attorney, Agent, or Firm*—Lowenstein Sandler, PC

(57) ABSTRACT

An iterative approach to vector median filtering wherein the resulting median vector need not be a member of the original data set. The iterative vector median filtering allows for fast convergence for complex computations and an output which is approximate to the mean, particularly for small data sets.

In addition, a method and system for registering and matching 2.5 normal maps is provided. Registration of two maps is performed by optimally aligning their normals through 2-D warping in the image plane in conjunction with a 3-D rotation of the normals. Once aligned, the average dot-product serves as a matching metric for automatic target recognition (ATR).

25 Claims, 4 Drawing Sheets

OTHER PUBLICATIONS

Wolff L.B., "Surface orientation from polarization images," in Proc. Optics Illumination and Image Sensing for Machine Vision II, vol. 850, pp. 110-121, 1987.

Sadjadi F.A. and Chun C.S.L., "Passive polarimetric IR target classification," IEEE Trans. on Aerospace and Electonics Systems, vol. 37, No. 2, pp. 740-751, 2001.

Worthington P.L. and Hancock E.R., "Object recognition using shape-from-shading," IEEE Trans. on Pattern Analysis and Machine Intelligence, vol. 23, No. 5, pp. 535-542, 2001.

Umeyama, S., "Least-squares estimation of transformation parameters between two point patterns," IEEE Trans. on Pattern Analysis and Machine Intelligence, vol. 13, No. 4, pp. 376-380, 1991.

Lu et al., "Three-Dimensional Model Based Face Recognition," Aug. 23-26, 2004, Proceedings of the 17th International Conference on Pattern Recognition, vol. 1, unnumbered, 5 pages total.

Lu et al., Matching 2.5D Scans for Face Recognition, Jul. 15-17, 2004, Springer-Verlag, pp. 30-36.

Mustafa et al., "3D object identification with color and curvature signatures," 1999, Elsevier Science Ltd., pp. 339-355.

Angelopoulou et al., "Sign of Gaussian Curvature from Curve Orientation in Photometric Space," Oct. 1998, IEEE Transactions on Pattern Analysis and Machine Intelligence, vol. 20, No. 10, pp. 1056-1066.

Baccar et al., "Segmentation of Range Images via Data Fusion and Morphological Watersheds," 1996, Elsevier Science Ltd., pp. 1673-1687.

Pentland, "Modal Descriptions for Recognition and Tracking," Dec. 7-9, 1992, IARP Workshop on MAchine Vision Applications, pp. 435-444.

\* cited by examiner

METHOD AND SYSTEM FOR FILTERING, REGISTERING, AND MATCHING 2.5D NORMAL MAPS

CROSS REFERENCE TO RELATED APPLICATIONS

This application is a divisional application of U.S. Non-Provisional application Ser. No. 11/451,671, filed Jun. 13, 2006, which claims the benefit of U.S. Provisional Application No. 60/689,967, filed Jun. 13, 2005 and U.S. Provisional Application No. 60/690,118, filed Jun. 13, 2005. U.S. Non-Provisional application Ser. No. 11/451,671 and U.S. Provisional Application Nos. 60/689,967 and 60/690,118 are hereby incorporated herein by reference.

GOVERNMENT RIGHTS IN THE INVENTION

This invention was made with U.S. government support under contract number S7-6BW317X6272. The U.S. government has certain rights in this invention

FIELD OF THE INVENTION

The present invention relates to automatic target recognition (ATR) using normal or needle map representations of objects.

BACKGROUND OF THE INVENTION

Automatic Target Recognition (ATR) methods and systems generally use remote sensors or image-capturing devices to track and affirmatively identify a particular target object. The integrity of the match between the detected object and the target object is of the utmost importance in most AIR applications, including, primarily, most military applications. In order to accurately determine that the object being tracked is in fact the target object, the signal processed via the remote sensor must contain the maximal amount of relevant information. The inevitable presence of noise corrupts and limits such information.

As such, conventional methods and systems are adapted to suppress or remove any noise in the image or the image signal. For example, in 2D image processing systems that convert each pixel of the captured image into a needle or normal vector representation of the visible surface at that particular image location. A 2.5D normal(s) or needle map, herein referred to as a "normal map" is defined as a type of perspective image wherein each pixel represents a 3-D surface normal. The normal map may be compactly represented by the notation n(r), where $n \in \Re^3$ is a vector representing the 3-D surface normals, and $r \exists \Re^2$ is a vector representing the 2-D pixel location in the image plane. Typically, the coordinate system for representing the surface normals is such that the $\hat{x}$ and $\hat{y}$ directions coincide with the image plane, while the $\hat{z}$ direction is perpendicular to the image plane. However, the captured image includes noise, and thus, the normals vectors include inaccuracies.

A standard method for suppressing noise is to apply a liner filter designed to leave frequencies with more signal than noise unchanged, while suppressing frequencies with more noise than signal. While this method is effective in noise reduction, the method results in unacceptable signal degradation. For example, suppressing noise in images in this way usually blurs edges because the filter combines sample values from both sides of the edge, giving an intermediate result. The blurring is noticeable and offensive to human viewers.

An alternative noise suppression method that avoids blurring involves the use of a median filter. The median filter receives an input signal, and for each location x of the given input signal (a pixel in the case of an image), the median filter replaces the value at x with the median of the previously identified or original sample values in a neighborhood of x. Most filters, including linear and median filters, use the same values in a neighborhood of x to compute the new value of x. An analogous neighborhood (i.e., one having the same size and shape) may be used for every location in the signal. The "size and shape" of a neighborhood is often referred to as the filter's "region of support."

These conventional filters identify the median of a set of vectors by taking the element of the set that has the smallest summed distance to the other vectors in the set. Although the conventional median filters avoid blurring edges because the median has the same value as one of the samples, such filters are limited because the median represents a scalar value.

Furthermore, this approach is inefficient because there may not be a choice of vector that is in the middle of the others in the set. As shown in FIG. 1, the neighborhood of sample includes three two-dimensional vectors (labeled A, B, and C) arranged close to the vertices of an equilateral triangle, such that neither vector A, B, or C is the obvious choice for the median. However, if one vector is slightly closer to the triangle's center (denoted by the "X" in FIG. 1) than the others (vector A in FIG. 1), the conventional median filter would select vector A as the median. Thus, this conventional median filter is very sensitive to small perturbations of the vectors, which can lead to undesirable effects.

Moreover, in the case of a 2.5D image of surface normals, the vectors on the edge where two surfaces join can flop back and forth between the normals of the two surfaces as one moves along the edge, making the edge appear to be jagged, when it should be smooth. Similarly, color images filter by conventional median filters also suffer from this type of inaccuracy, wherein a smooth edge becomes jagged. In addition, the conventional median filter requires significant computation resources for operation.

Furthermore, many ATR applications require that two 2.5D normal maps be matched to determine if they represent the same object. Precise matching requires that the two normal maps undergo registration process. Registration of two images, taken at different times, and/or by different sensors, is the process of aligning the images such that they coincide, according to some well-defined criteria. However, conventional ATR systems and methods lack a technique or process for the registration of 2.5-D normal maps.

Accordingly, there is a need in the art for an efficient method and system for determining an optimized vector median and registration of 2.5D normal maps in order to generate improved matching of 2.5D normal maps in object recognition applications.

SUMMARY OF THE INVENTION

The present invention relates to a method and system for performing automatic target recognition (ATR) of one or more unknown objects. According to an embodiment of the present invention, a image capturing device or sensor is used to observe the unknown object and capture an image of an unknown object or data representative of the observed object image. The image or image-representative data associated with the unknown object is collectively referred to as the "observed object data."

The present invention relates to an iterative approach to vector median filtering wherein the resulting median vector need not be a member of the original data set. The iterative vector median filtering allows for fast convergence for complex computations and an output which is approximate to the mean, particularly for small data sets.

According to an embodiment of the present invention, a method and system for registering and matching 2.5 normal maps is provided. Registration of two maps is performed by optimally aligning their normals through 2-D warping in the image plane in conjunction with a 3-D rotation of the normals. Once aligned, the average dot-product serves as a matching metric for automatic target recognition (ATR).

According to an embodiment of the present invention, a method and system is provided for identifying a observed object. The target identification method and system determines a best match by comparing the observed object with model images/objects.

According to an embodiment of the present invention, the target identification method involves the observation of an object, converting the image or data of the observed object into a corresponding normals map representation, denoising or filtering the normals map, comparing or registering the observed object normals map with one or more previously identified normal maps stored in a database (herein referred to as "stored normal maps") to produce a plurality of registered normal map pairs, analyzing the registered normal map pairs to determine a match score for each, and identifying the best match or matches.

According to an embodiment of the present invention, the target object data is converted into a normals map representation(s) of the target object(s). A needle or normal map, collectively referred to herein as a "normal map" is defined as a type of perspective image wherein each pixel represents a 3-D surface normals. The normals map may be compactly represented by the notation n(r), where $n \in \Re^3$ is a vector representing the 3-D surface normals, and $r \in \Re^2$ is a vector representing the 2-D pixel location in the image plane. Typically, the coordinate system for representing the surface normals is such that the $\hat{x}$ and $\hat{y}$, directions coincide with the image plane, while the $\hat{z}$ direction is perpendicular to the image plane.

According to an embodiment of the present invention, the observed object data is converted into a 2.5D normal map. The normal map is then denoised or filtered to remove sensor related noise. The normal map is filtering using the iterative vector median filter method and system of the present invention. Optionally, the normal map may be segmented into one or more particular regions or objects of interest.

The observed or unknown normal map is then registered or aligned to reference normal maps, which are known normal maps, optionally stored in a computer-accessible database. Registration of the observed normal map and each of the reference normal maps produces a number of registered normal map pairs. In the final stage of the process, a match score is calculated for each of the registered normal map pairs, and one or more best matches are determined, thereby resulting in the identification of the observed object.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts and embodiments of the invention and may not be to scale.

DETAILED DESCRIPTION OF THE INVENTION

The present invention relates to a method and a system for monitoring, analyzing, and recognizing one or more objects of a given environment, referred to as an automatic target recognition environment.

Figure 2:
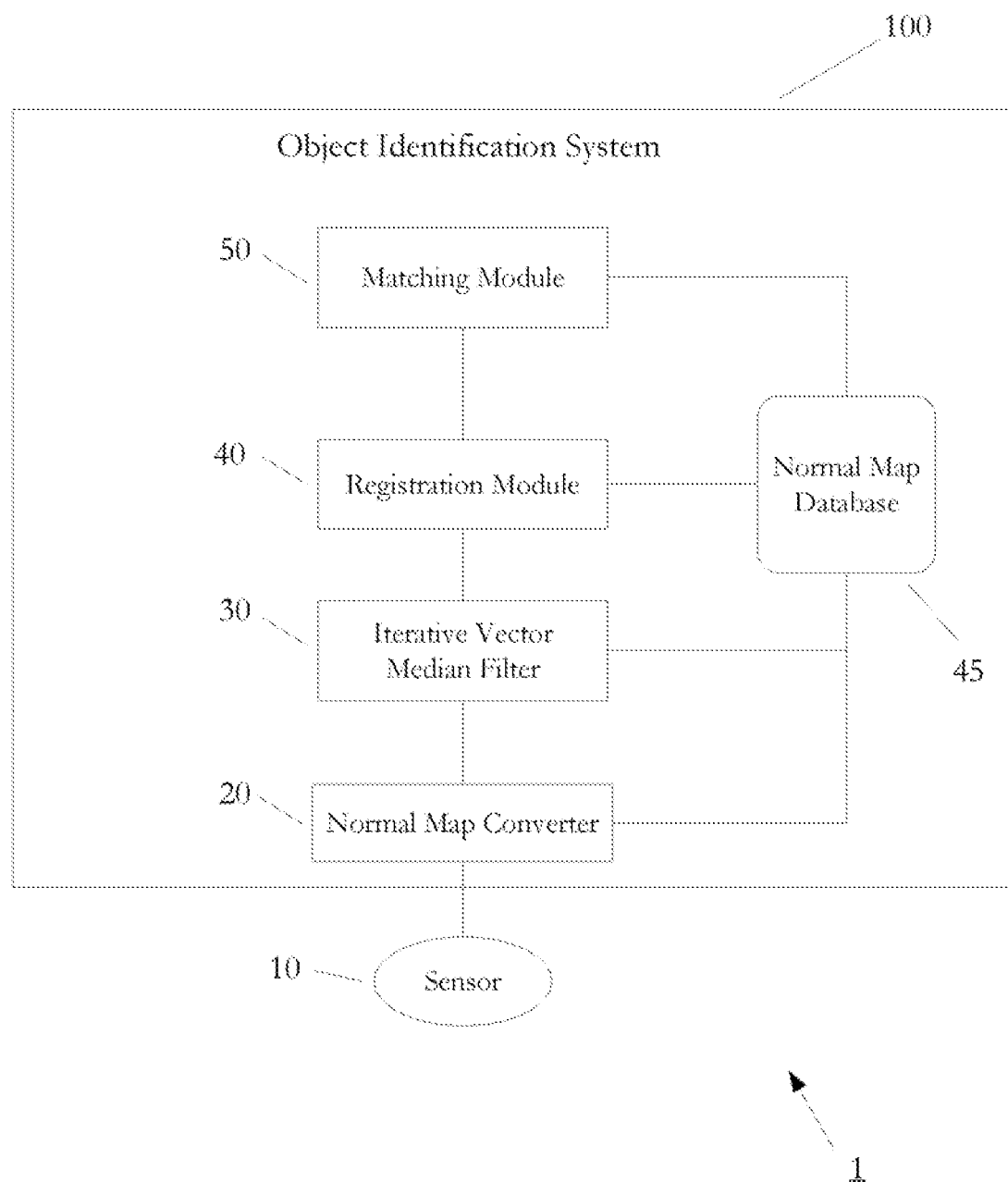
FIG. 2 shows an automatic target recognition environment including an exemplary object identification system, according to an embodiment of the present invention.

FIG. 2 depicts an exemplary automatic target recognition environment 1 managed by the methods and systems according to the present invention. According to an embodiment of the present invention, the ATR environment 1 includes an object identification system 100 communicatively connected to one or more sensors 10 configured to monitor one or more scenes. The term "communicatively connected" is intended to include any type of connection, whether wired or wireless, in which data may be communicated. The term "communicatively connected" is intended to include a connection between devices and/or programs within a single computer or between devices and/or programs on separate computers.

According to an embodiment of the present invention, as depicted in FIG. 2, the object identification system 100 is a computer-based system which includes, but is not limited to, the following components: a Normal Map Converter 20, a Iterative Vector Median Filter 30, Registration Module 40, a Normal Map Database 45, and a Matching Module 50. As used herein, the term "computer" is intended to include any data processing device, such as a desktop computer, a laptop computer, a mainframe computer, a personal digital assistant, a server, a handheld device, or any other device able to process data.

One having ordinary skill in the art will appreciate that the components of the object identification system 100 may be comprised of one or more computer-executed programs or computer-accessible devices, which may be executed and/or accessed by a single computer or multiple computers.

Figure 3:
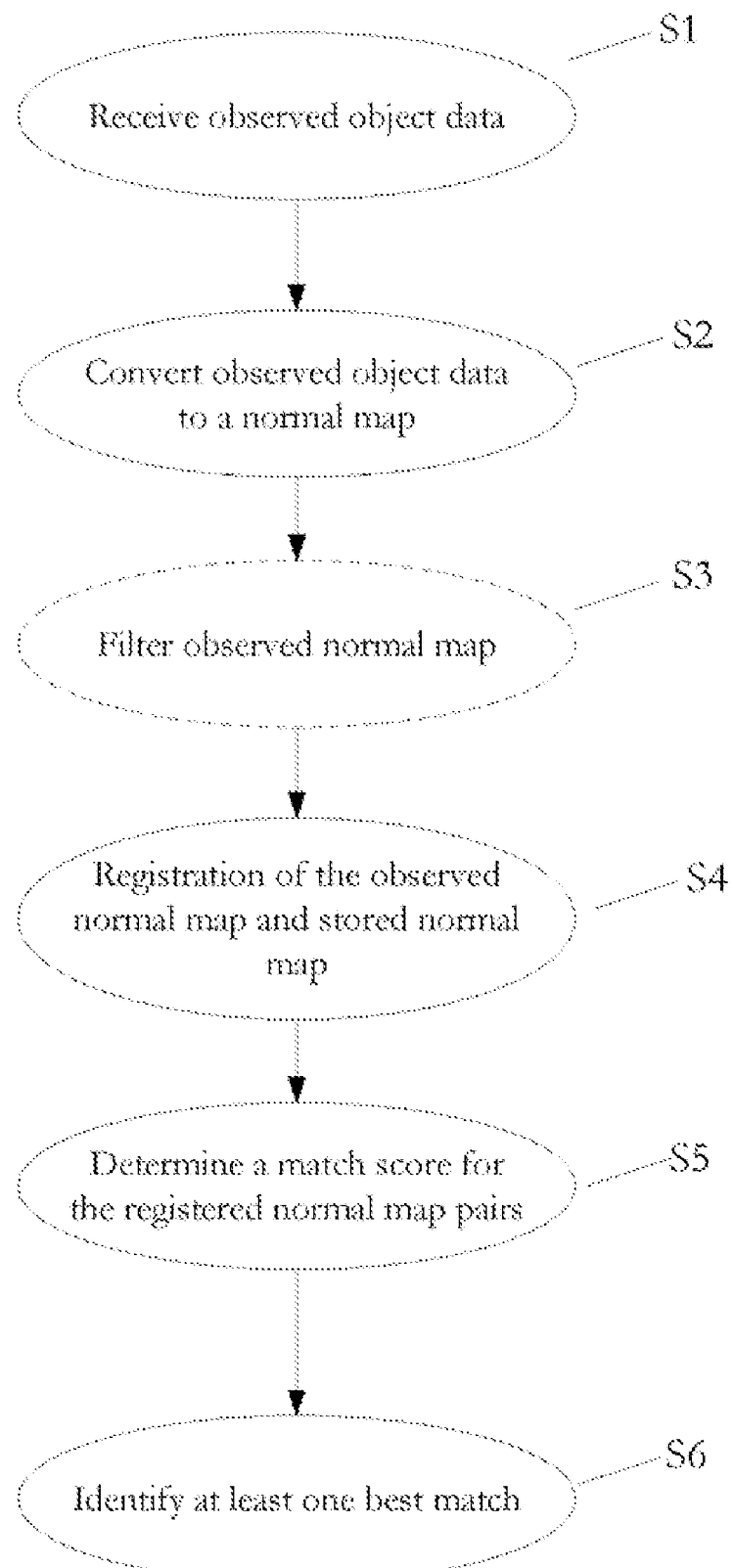
FIG. 3 illustrates the steps of an exemplary target recognition method, according to an embodiment of the present invention.

FIG. 3 illustrates the steps performed by the object identification system 100, according to an embodiment of the present invention. The present invention is described in detail below with reference to the object identification system 100, as shown in FIG. 2, and the target identification method, as illustrated in FIG. 3.

According to an embodiment of the present invention, one or more sensors 10 are used to monitor a particular area of interest in the ATR environment 1. The sensor 10 may include any suitable image capturing device or image-data capturing device configured to capture an image and/or collect image-related data. The image related data may include, but is not limited to, sufficient information for estimation of the surface normals. For example, such image data may includes single or multiple intensity grayscale or color images, or polarization. Furthermore, the image-related data may include information about the viewing conditions, such as direction to the sun, amount of cloud cover, and so on. The sensor 10 captures an image and/or image-related data of one or more observed objects. As used herein, the image and/or image-related data associated with the observed object is referred to as the observed object data. One having ordinary skill in the art will appreciate that the object may include, but is not limited to any animate or inanimate object, such as, for example, a vehicle, aircraft, or building.

The sensor 10 provides the observed object data to the object identification system 100, which is received by the Normal Map Converter 20, as shown in step S1 in FIG. 3. The Normal Map Converter 20 is a computer or computer-executed program configured to convert the observed object data into a corresponding 2.5D normal map, herein referred to as the "observed normal map." One having ordinary skill in the art will appreciate that the data from the sensor 10 may be converted into a normal map using any suitable conversion technique, including, but not limited to, a photometric stereo analysis of multiple images, a shape-from-shading analysis of a single image, an analysis of the polarization of light reflected from surfaces, or other suitable normal map generation technique. See e.g., Woodham R. J., *Photometric method for determining surface orientations from multiple images*, Optical Engineering, vol. 19, pp. 139-144 (1980); Zhang R, Tsai P. S. et al., *Shape from Shading: A Survey*, IEEE Trans. on Pattern Analysis and Machine Intelligence, vol. 21, no. 8, pp 690-706 (1999); Wolff L. B., *Surface orientation from polarization images*, Proc. Optics Illumination and Image Sensing for Machine Vision II, vol. 850, pp. 110-121 (1987).

According to an embodiment of the present invention, the Normal Map Converter 20 may provide the observed normal map to the communicatively connected Normal Map Database 45 for storage and future reference.

The observed object normal map is provided by the Normal Map Converter 20 to the Iterative Vector Median Filter 30. The Iterative Vector Median Filter 30 is configured to perform an iterative median filtering process for denoising or filtering the observed object normal map, as shown in step S3 in FIG. 3. One having ordinary skill in the art will appreciate that the Iterative Vector Median Filter 30 and associated process step(s) are optional components of the Object Identification System 100, and may be omitted from the object identification process described herein. Accordingly, step S3 in FIG. 3 is denoted by a dashed line to indicate that it is an optional step in the object identification process.

According to an embodiment of the present invention, the Iterative Vector Median Filter 30 is configured to minimize a criteria, denoted as J, based on the distance from an unknown vector, $v_{med}$, to each of the vectors $v_i$ in the filter's region of support:

$$J = \sum_i \|v_i - v_{med}\|$$

Typically, according to conventional techniques, the vector median is found by conducting a search for one member of the data set, denoted as j*, that minimizes J, according to the following equation:

$$j^* = \arg\min_j \sum_i \|v_i - v_j\|$$

where $v_{med} = v_{j^*}$ (See e.g., Astola, J. et al., *Vector median filters*, Proceedings of the IEEE, Volume 78, Issue 4, Page(s): 678-689 (April 1990).

According to an embodiment of the present invention, the Iterative Vector Median Filter 30 is configured to identify the optimal vector median which satisfies the following equation:

$$\frac{\partial J}{\partial v_{med}} = \sum_i \frac{v_i - v_{med}}{\|v_i - v_{med}\|} = 0$$

The optimal vector median may be determined by solving for $v_{med}$ in the numerator of the following expression:

$$v_{med}^{t+1} = \frac{\sum_i \dfrac{v_i}{\|v_i - v_{med}^t\|}}{\sum_i \dfrac{1}{\|v_i - v_{med}^t\|}}$$

where t is the iteration number. The above expression is iterative because the variable to be determined, $v_{med}$, appears on both sides of the equation. Optimization proceeds by setting or initializing an initialized vector median, $v_{med}^0$ (i.e., where t=0), typically to the mean of the vector field, and then continually reapplying the above equation until $v_{med}$ converges. A common criterion for convergence is that $\|v_{med}^{t+1} - v_{med}^t\|$ is less than a desired threshold. One having ordinary skill in the art will appreciate that this is a generalization to vectors of a known algorithm for finding the median of a set of scalar values. See e.g., Press, W. H. et al., *Numerical Recipes in C*, Cambridge University Press, (1988).

Figure 1:
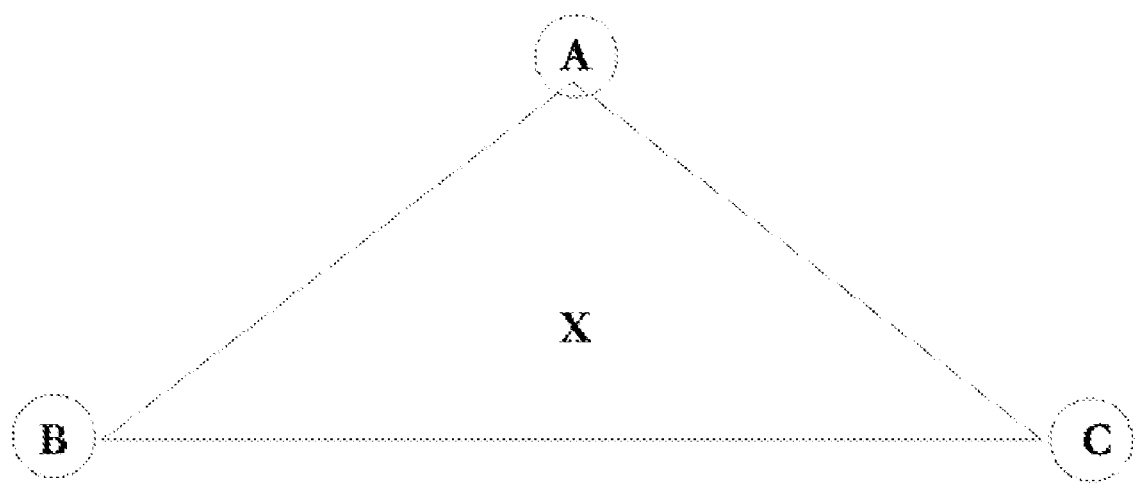
FIG. 1 illustrates a comparison of vector median identification according to a conventional median filter and an iterative vector median filter according to an embodiment of the present invention.

Advantageously, the iterative vector median filter does not always converge to a member of the data set. According to an embodiment of the present invention, the Iterative Vector Median Filter 30 is configured to initialize the vector median to the mean, thus resulting in a fast convergence. For example, in the normal-smoothing application described below, convergence to within ¹⁄₁₀ degree is typically obtained in less than five iterations for a 3×1 vector field having nine members. In comparison, in order to calculate the distance from each vector to the others in the data set, conventional methods require nine passes through the vector field, wherein each pass is comparable to an iteration. Referring to the example in FIG. 1, the iterative vector median filter method of the present invention results in the identification of median X for the data set (A, B, C).

According to conventional methods, for a set of N vectors, the distance between every pair in the set must be computed, thus requiring the computation of N(N−1)/2 distances. In contrast, the Iterative Vector Median Filter 30 requires only NM distance computations, where M is the number of iterations needed to converge. The Iterative Vector Median Filter 30 is particularly suited for use in analyzing a large region of support (i.e., a region with a large N, because the difference between M and (N−1)/2 becomes increasingly significant for larger N having a large region of support. This makes conventional vector median filters impractical for filtering a large region of support.

According to an embodiment of the present invention, the Iterative Vector Median Filter 30 may be used to smooth any vector field, as provided in the examples below. According to a first example application, the Iterative Vector Median Filter 30 is applied to a 2.5D normal map, wherein the Iterative Vector Median Filter 30 smoothes surfaces while preserving the edges. First, the Iterative Vector Median Filter 30 is applied over local regions in an image plane, as represented in the following expression:

$$J = \sum_{x,y \in R} \|n(x, y) - n_{med}(x, y)\|$$

where n(x,y) is a surface normal at the image coordinates (x,y) belonging to the local region R. If the Iterative Vector Median Filter 30 is repeatedly applied to the same normals image, it tends to converge to a stable result consisting of the primary flat surfaces of the object. This is in direct contrast to mean or Gaussian filtering, which continues to round off edges with each application, eventually resulting in a sphere-like surface.

Another exemplary application of the Iterative Vector Median Filter 30 is to color images, where Iterative Vector Median Filter 30 is used to remove outliers in the color space. Again, the iterative Vector Median Filter 30 is applied over local regions in the image plane, according to the following expression:

$$J = \sum_{x,y \in R} \|c(x, y) - c_{med}(x, y)\|$$

where c(x,y) is a vector representing the color of the pixel at image coordinates (x,y) within the neighborhood R.

Optionally, following the filtering step, the observed normal map may be segmented into a region or particular object of interest, according to any suitable segmentation technique.

According to an embodiment of the present invention, the filtered or denoised observed normal map is then provided by the Iterative Vector Median Filter 30 to the communicatively connected Registration Module 40. Optionally, the filtered observed normal map may be provided to the communicatively connected Normal Map Database 45 for storage.

The Registration Module 40 is configured to perform registration of the observed normal map and one or more stored normal maps maintained in the communicatively connected Normal Map Database 45, as shown in step S4 of FIG. 3. According to an embodiment of the present invention, the registration procedure comprises optimally aligning the normals between the observed normal map and one or more stored normal maps through a 2-D warping in the image plane, in conjunction with a 3-D rotation of the normals.

Figure 4:
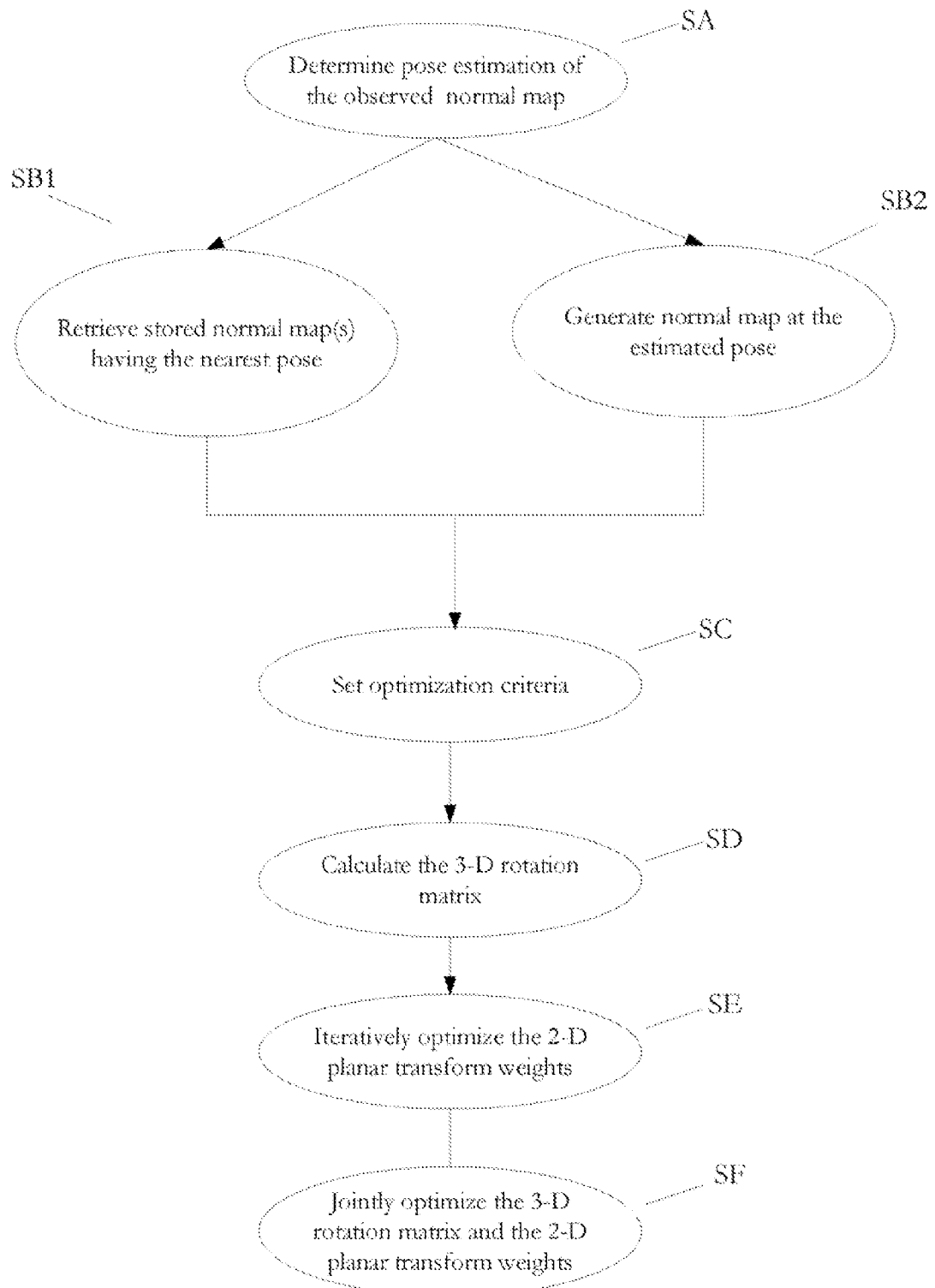
FIG. 4 illustrates the steps of an exemplary 2.5D normal map registration process, according to an embodiment of the present invention.

The steps of an exemplary registration process performed by the Registration Module 40 according to an embodiment of the present invention are illustrated in FIG. 4. According to an embodiment of the present invention, in step SA, a pose estimate is generated for the filtered observed normal map. One having ordinary skill in the art will appreciate that any suitable pose estimation method may be used in accordance with the present invention.

Pose estimation is important because the restoration process involves the alignment of an observed normal map for which the polarization is unknown, and normal maps stored in the Normal Map Database 45 having a known pose information. As such, having an initial estimate of the pose greatly reduces the amount of searching of the Normal Map Database 45 to find likely matches.

One exemplary pose estimation method suitable for use in accordance with the present invention is a gnomonic projection method, described in detail below. The gnomonic projection is a nonconformal map projection of points on the surface of a sphere onto a plane tangent to the sphere. The projection is obtained by extending a line containing the surface normal until it intersects with a tangent plane. The gnomonic projection maps great circles on the sphere to lines on a plane. The normal vectors of box-like objects, such as vehicles, tend to lie on great circles. Thus, this projection may be used to determine pose by searching for lines in the projection.

According to an embodiment of the present invention, The equation of the tangent plane in the coordinate system of the sensor is z=1. The parametric equation of a line passing through the origin is given by:

$$x=n_x t, y=n_y t, z=n_z t$$

The intersection of the line with the plane occurs at $1=n_z t$ or $t=1/n_z$. Thus, the projection is given by:

$$x = \frac{n_x}{n_z}, \; y = \frac{n_y}{n_z}$$

One having ordinary skill in the art will note that the above expression is the negative of the gradient in the x and y directions, respectively. A scatter plot of the surface normals onto this plane reveals lines, the orientation of which have a one-to-one mapping with the pose. The lines may be determined according to any suitable method or technique. For example, these lines may be determined through a Hough transform or by a mixture of linear experts.

After fitting a line in the projection plane, the object pose may be determined. For example, a pose, $p=[p_x \, p_y \, p_z]$, may be described in terms of the normal to the great circle. As such, the equation of a plane that includes the great circle is given by:

$$p_x x + p_y y + p_z z = 0$$

The intersection of this plane with the tangent plane at z=1 generates the line:

$$p_x x + p_y y + p_z = 0$$
$$y = -\frac{p_x}{p_y} x - \frac{p_z}{p_y}$$

Next, fitting a line to the real data in the gnomonic projection plane y=ax+h, then the pose parameters in terms of the line parameters may be expresses as follows:

$$p = \frac{1}{\sqrt{1+a^2+b^2}} [a \; -1 \; b]$$

For poses wherein both a side and front/back of the object are visible, the normals tend to form two or three orthogonal great circles. The orthogonality of any two great circles creates a constraint on the two lines resulting from the gnomonic projection, according to the following expression:

$$p_1^T p_2 = 1 + a_1 a_2 + b_1 b_2 \approx 0$$

Advantageously, this constraint may be used to determine the lines, or, alternatively, the constraint may be used as a check, if the lines are found independently.

According to another embodiment of the present invention, the pose estimation may be performed according to a K-means clustering on a unit sphere, wherein K-means clustering is used to discover the primary surfaces represented by the surface normals of the observed normal map.

According to this approach, cluster centers, $\{c_k\}$, are determined such that the normals, each of which is assigned to the nearest cluster center, maximizes their projection onto their respective cluster center, resulting in the following optimization criteria:

$$J(K) = \sum_{k=1}^{K} \sum_{x,y \in S_k} [1 - n^T(x, y)c_k].$$

The cluster centers are found through a two-stage process, consisting of a series of batch updates, followed by a stochastic online update for fine-tuning. The number of clusters centers may be found automatically by monitoring the fractional decrease in the optimization criteria, J(K), as a function of the number of cluster centers, K.

The pose may then be extracted from the cluster centers through the gnomonic projection, as described in detail above. Alternatively, a search may be conducted for pairs of cluster centers whose cross-product is equal to a third cluster center.

Referring to FIG. 4, in step SB1, one or more model or known normal maps having a similar pose estimation to the filtered observed map are retrieved by the Registration Module 40 from the Normal Map Database 55. Alternatively, in step SB2, one or more normal maps having the estimated pose of the filtered observed object map may be generated. Following generation, the generated pose estimated normal maps are also stored in the Normal Map Database 45 and accessible by the Registration Module 40. Collectively, the generated and stored pose estimated normal maps are referred to as the "reference normal maps."

According to an embodiment of the present invention, in step SC, optimization criteria is set for the registration analysis. For normal maps, the optimization criteria is the average L2-norm of the difference between corresponding surface normals of the observed normal map and the reference normal map. However, if the two normals maps were obtained from differing viewpoints, then the surface normals of corresponding pixels in one image will be rotated with respect to the other image. Therefore, the registration criteria must include a rotation matrix operating on one of the normal maps.

Like intensity image registration, in order to optimally align the pixels in the image plane, the 2-D position of the surface normals of one of the maps are transformed or warped in the image plane. As such, the following optimization criteria is set, as follows:

$$J = \frac{1}{2} \sum_{r_1} \|n'_2(f(r_1; w)) - Rn_1(r_1)\|^2 \quad (1)$$

where $n_1(r_1)$ is one normal map (e.g., the observed normal map) as a function of planar image coordinates $r_1$; where $n_2(r_2)$ is a second normal map (e.g., the reference normal map) as a function of planar image coordinates $r_2 = f(r_1; w)$, parameterized by the planar transform weights w; and where R is a 3-D rotation matrix. Optionally, one having ordinary skill in the art will appreciate that the rotation matrix could alternatively operate on $n_2$.

Registration consists of optimizing the criteria with respect to the rotation matrix, R, and the warping parameters, w. As such, as shown in step SD, the rotation matrix R is determined. One having ordinary skill in the art will appreciate that for a given planar transformation, there is an analytical solution for the 3-D rotation matrix, as expressed in the following equation:

$$\frac{\partial J}{\partial R} = 0 \Rightarrow R = UV^T$$

where the orthogonal matrices U and V are derived from the singular value decomposition of the outer product of the normals:

$$USV^T = SVD\left(\sum_{r_1} n_2(f(r_1; w))n_1^T(r_1)\right)$$

(see e.g., Umeyama, S. et al., *Least-squares estimation of transformation parameters between two point patterns*, IEEE Trans. on Pattern Analysis and Machine Intelligence, vol. 13, no. 4, pp. 376-380 (1991).

The orthogonality of U and V guarantees that R is also orthogonal, and thus represents a pure rotation.

Next, in step SE, the 2-D planar transform weights are optimized according to an iterative method. According to an embodiment of the present invention, a Gauss-Newton method is applied, $$\Delta w = -\left(\frac{\partial^2 J}{\partial w \partial w^T}\right)^{-1} \frac{\partial J}{\partial w}$$

where the gradient is given by:

$$\frac{\partial J}{\partial w} = \sum_{r_1} \frac{\partial r_2^T}{\partial w} \frac{\partial n_2^T}{\partial r_2} [n_2(r_2) - Rn_1(r_1)]$$

and the Hessian matrix is approximated by the outer product of the gradient, according to the following expression:

$$\frac{\partial^2 J}{\partial w \partial w^T} \approx \sum_{r_1} \left[\frac{\partial r_2^T}{\partial w} \frac{\partial n_2^T}{\partial r_2}\right]\left[\frac{\partial r_2^T}{\partial w} \frac{\partial n_2^T}{\partial r_2}\right]^T$$

According to an embodiment of the present invention, for the special case of an affine transform, the following expressions are applied:

$$r_2 = P_1^T w$$

-continued $$\frac{\partial r_2^T}{\partial w} = P_1$$

$$P_1^T = \begin{bmatrix} 1 & x_1 & y_1 & 0 & 0 & 0 \\ 0 & 0 & 0 & 1 & x_1 & y_1 \end{bmatrix}$$

$$w^T = \begin{bmatrix} w_1 & w_2 & w_3 & w_4 & w_5 & w_6 \end{bmatrix}^T$$

The affine transform is capable of several types of geometric warpings, including the identity, translation, scaling, rotation, reflection, and shear. However, it does not in general preserve lengths and angles.

Evaluation of $n_2(f(r_1:w))$ requires interpolation of the warped normal map, for example, at non-integer planar coordinates. For intensity image registration, the most common interpolation methods are nearest neighbor, bi-linear, and higher-order non-linear methods. The nearest neighbor method is equally applicable to normal maps without modification. However, the other methods require modification because the normals components are not independent. According to an embodiment of the present invention, this is accounted for by independent interpolation of the three components followed by renormalization Next, in step SF, the 3-D rotation matrix and the 2-D planar transform weights are jointly optimized. Optimization proceeds by alternating between calculation of the 3-D rotation matrix, R, and iterative optimization of the 2-D planar transform weights, w.

For a given rotation matrix, the 2-D planar transform is optimized until no further improvement in the criteria is observed (or up to a maximum number of iterations). At such point, the rotation matrix is recalculated using the latest alignment between the two images, and then the optimization of the planar transform is begun anew.

The final stopping criteria is reached when no further improvement in the criteria is observed between successive recalculations of the rotation matrix. The registration method is initialized with affine transform weights that correspond to the identity transform, and a rotation matrix calculated from the original normal maps.

According to an embodiment of the present invention, the optimization criterion occasionally increases, indicating that the Newton approximation is poor in this region of the weight space. Accordingly, the Newton update rule may be replaced with a model-trust region approach, whereby a scaled diagonal matrix is added to the Hessian matrix, as follows:

$$H \Rightarrow H + \lambda I.$$

The optimal value of the scaling factor may be determined through a suitable line-search technique (e.g., Levenberg-Marquardt).

According to an embodiment of the present invention, the registration process, as illustrated in FIG. 4, may also be performed at multiple image scales, from coarse to fine-scale. According to this embodiment, the alignment parameters at the next higher scale are used as a seed for the next lower scale. Advantageously, this reduces the chance that the optimization may get 'stuck' in a local minima, and also speeds up the registration.

According to an embodiment of the present invention, the registration process may also include optical flow, which allows each pixel to move a small amount independently of the other pixels. This approach allows the registration to make better use of fine features, such as the detailed structure of a vehicle nose, which is highly salient, rather than broader features such as the shape and angle between large planar-like surfaces.

According to an embodiment of the present invention, an affine may be regarded as an approximation of the more general perspective transform. Using the perspective transform improves registration alignment for large pose deviations. While the perspective transform is the more rigorously correct transform, it is non-linear, which makes it difficult to optimize in the context of registration. However, this problem can be mitigated by performing an affine registration first, and then using the affine parameters to initialize the perspective registration.

Optionally, according to an embodiment of the present invention, if a particular target image of interest has been identified, then the observed object normal map may be compared directly to one or more reference normal maps related specifically to that target object. For example, if the target object/image of interest is a 2004 Honda Accord, then the Registration Module 40 may retrieve and register the observed normal map with reference normal maps associated with or depicting a 2004 Honda Accord. Further, the Normal Map Database 45 and reference normal maps stored therein may be organized into groups of related objects. For example, for a vehicle identification application, the Normal Map Database 45 may include groups defined by the vehicles' make and/or model.

Following completion of the registration process, the plurality of registered observed normal map and reference normal map, herein referred to as the "registered normal map pairs" are provided by the Registration Module 40 to the Matching Module 50. The Matching Module 50 is a computer-executable program configured to conduct a matching process using the normal maps directly, in order to generate a matching score between the observed normal map and one or more reference normal maps, as shown in step S5 of FIG. 3.

According to an embodiment of the present invention, the match score for each registered normal map pair may be derived from the minimum value of the registration criteria, or more complicated features may be compared using the point correspondences obtained from the registration. According to an embodiment of the present invention, the registration criteria itself is used.

Note that if the normals have unity norm and R is a true rotation matrix, then the registration criteria may be expressed as:

$$J = \sum_{r_1} 1 - n_2^T(r_2) R n_1(r_1)$$

which is one minus the dot-product, summed over all pixels. The match score (S), which serves as the metric for determining whether the object(s) in the registered normal map pair are the same, is the average dot-product between the two normal maps after registration, and is represented according to the following expression:

$$S = 1 - \frac{J}{N} = \frac{1}{N} \sum_{r_1} n_2^T(r_2) R n_1(r_1)$$

where N is the number of registered pixels. As such, the dot product tends to have a value of one for identical objects, and a value of zero for randomly unrelated objects.

According to an embodiment of the present invention, the registered normal map pair or pairs with the largest average dot-product value(s) are identified as the at least one "best match," as shown in step S6. One having ordinary skill in the art will appreciate that the match scores, the at least one best match, and/or information related to the best match(es) may be provided to the communicatively connected Normal Map Database 45 for storage, or output for display or further processing. According to an embodiment of the present invention, the at least one best match may be displayed (e.g., on a computer display) as a graphical representation showing the observed object and the matching model image.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method of registering normal maps, comprising the steps of:
   converting observed object data to an observed normal map;
   calculating a 3-D rotation matrix for a first normal map and a second normal map;
   producing 2-D planar transform weights by warping a 2-D position of surface normals of at least one of the observed normal map and each reference normal map in an image plane; and
   jointly optimizing the 3-D rotation matrix and the 2-D planar transform weights of the first and second normal maps until convergence to a registered normal map pair.

2. The method of claim 1, further comprising the step of setting an optimization criteria for registration, said setting including determining the L2-norm of a difference between corresponding surface normals of the first normal map and the second normal map.

3. The method of claim 1, further comprising the step of estimating a pose of the observed normal map, wherein the pose is estimated using a gnomonic projection.

4. The method of claim 3, wherein the step of estimating comprises generating at least one cluster center using a K-means clustering method, and extracting the pose from the at least one cluster center through the gnomonic projection.

5. The method of claim 1, further comprising the step of warping in the image plane the 2-D position of the surface normals of one at least one of the first normal map and the second normal map.

6. The method of claim 1, wherein said step of calculating a 3-D rotation matrix includes finding orthogonal matrices U,V such that the 3-D rotation matrix R is equal to $R=UV^T$ where U and V are derived from the singular value decomposition of the outer product of a plurality of surface normals of at least one of the first normal map and the second normal map.

7. The method of claim 1, wherein the 2-D planar transformation weights are optimized according to an iterative method.

8. The method of claim 7, wherein the iterative method includes a Gauss-Newton method.

9. The method of claim 7, wherein the iterative method includes a model-trust region approach, whereby a scaled diagonal matrix is added to the Hessian matrix.

10. The method of claim 9, wherein the optimal value of a scaling factor is determined using a line-search technique.

11. The method of claim 7, further comprising the step of interpolating the warped versions of the at least one of the observed normal map and each reference normal map at non-integer planar coordinates.

12. The method of claim 11, wherein said step of interpolating further includes independently interpolating using nearest neighbor, bi-linear, and highest-order non-linear methods followed by renormalization.

13. The method of claim 2, wherein jointly optimizing the 3-D rotation matrix and the 2-D planar transform weights proceeds by alternating between calculating of the 3-D rotation matrix and iterative optimization of the 2-D planar transformation weights.

14. The method of claim 13, wherein the step of jointly optimizing further includes the steps of:
   (a) optimizing the 2-D planar transformation weights until at least one of no further improvement in the optimization criteria is observed and up to a maximum number of iterations are executed;
   (b) recalculating the rotation matrix using the latest alignment between two images, and
   (c) repeating steps (a) and (b) until no further improvement in the criteria is observed between successive recalculations of the rotation matrix.

15. The method of claim 1, wherein said calculating, producing, and jointly optimizing steps are performed at multiple image scales, from course to fine scale.

16. The method of claim 15, wherein alignment parameters at a next higher scale are used as a seed for the next lower scale.

17. The method of claim 1, wherein said calculating, producing, and jointly optimizing steps include optical flow.

18. A non-transient computer-readable storage medium storing computer code for registering normal maps, wherein the computer code comprises:
   code for converting observed object data to an observed normal map;
   code for calculating a 3-D rotation matrix for a first normal map and a second normal map;
   code for producing 2-D planar transform weights by warping a 2-D position of surface normals of at least one of the observed normal map and each reference normal map in an image plane; and
   code for jointly optimizing the 3-D rotation matrix and the 2-D planar transform weights of the first and second normal maps until convergence to a registered normal map pair.

19. The computer-readable medium of claim 18, further comprising code for setting an optimization criteria for registration, said setting including determining the L2-norm of a difference between corresponding surface normals of the first normal map and the second normal map.

20. The computer-readable medium of claim 18, wherein code for calculating a 3-D rotation matrix includes code for finding orthogonal matrices U,V such that the 3-D rotation matrix R is equal to $R=UV^T$ where U and V are derived from the singular value decomposition of the outer product of a plurality of surface normals of at least one of the first normal map and the second normal map.

21. The computer-readable medium of claim 18, wherein the 2-D planar transformation weights are optimized according to an iterative method.

22. The computer-readable medium of claim 21, wherein the iterative method includes a Gauss-Newton method.

23. The computer-readable medium of claim 19, wherein jointly optimizing the 3-D rotation matrix and the 2-D planar transform weights proceeds by alternating between calculating of the 3-D rotation matrix and iterative optimization of the 2-D planar transformation weights.

24. The computer-readable medium of claim 23, wherein code for jointly optimizing further includes:
- code for (a) optimizing the 2-D planar transformation weights are optimized until at least one of no further improvement in the optimization criteria is observed and up to a maximum number of iterations are executed;
- code for (b) recalculating the rotation matrix using the latest alignment between two images; and
- code for (c) repeating (a) and (b) until no further improvement in the criteria is observed between successive recalculations of the rotation matrix.

25. The computer-readable medium of claim 18, wherein said calculating, producing, and jointly optimizing steps are performed at multiple image scales, from course to fine scale.

* * * * *